United States Patent
Hsieh et al.

(10) Patent No.: US 11,729,637 B2
(45) Date of Patent: Aug. 15, 2023

(54) ENHANCEMENT TO EXPEDITE SECONDARY CELL (SCELL) OR PRIMARY SCELL (PSCELL) ADDITION OR ACTIVATION

(71) Applicant: MEDIATEK INC., Hsin-Chu (TW)

(72) Inventors: Chi-Hsuan Hsieh, Hsin-Chu (TW);
Din-Hwa Huang, Hsin-Chu (TW);
Tsang-Wei Yu, Hsin-Chu (TW);
Chun-Fan Tsai, Hsin-Chu (TW)

(73) Assignee: MediaTek INC., Hsin Chu (TW)

( * ) Notice: Subject to any disclaimer, the term of this patent is extended or adjusted under 35 U.S.C. 154(b) by 139 days.

(21) Appl. No.: 17/321,368

(22) Filed: May 14, 2021

(65) Prior Publication Data

US 2021/0409975 A1    Dec. 30, 2021

Related U.S. Application Data (60) Provisional application No. 63/054,835, filed on Jul. 22, 2020, provisional application No. 63/045,928, filed on Jun. 30, 2020.

(51) Int. Cl.
*H04W 24/02* (2009.01)
*H04L 5/00* (2006.01)
*H04W 48/20* (2009.01)

(52) U.S. Cl.
CPC .......... *H04W 24/02* (2013.01); *H04L 5/0048* (2013.01); *H04W 48/20* (2013.01)

(58) Field of Classification Search
CPC ...... H04W 24/02; H04W 48/20; H04L 5/0048
USPC ....................................................... 370/329
See application file for complete search history.

(56) References Cited

U.S. PATENT DOCUMENTS

| | | | |
|---|---|---|---|
| 2018/0294910 A1 | 10/2018 | Kim et al. | H04J 11/0076 |
| 2019/0215117 A1* | 7/2019 | Lee | H04L 5/0082 |
| 2020/0053782 A1* | 2/2020 | Zhang | H04L 5/0051 |
| 2021/0226751 A1* | 7/2021 | Zhang | H04W 72/21 |
| 2021/0227432 A1* | 7/2021 | Zhang | H04L 1/1678 |
| 2021/0337525 A1* | 10/2021 | Rahman | H04W 16/28 |
| 2022/0217800 A1* | 7/2022 | Zhang | H04L 5/0048 |
| 2022/0264448 A1* | 8/2022 | Gonuguntla | H04L 5/0023 |

OTHER PUBLICATIONS

R2-1914381, Qualcomm Incorporated, "Discussion on fast SCell activation based on Aperiodic TRS (A-TRS)", 3GPP TSG RAN WG2 Meeting #108, Nov. 18-22, 2019.
R4-1910918, MediaTek Inc., "Discussion on NR fast SCell activation", 3GPP TSG-RAN WG4 Meeting #92Bis, Oct. 14-18, 2019.
3GPP TS 38.133 V16.3.0 (Mar. 2020), 3.1, 8.2.1.2.4, 8.2.3.2.3, "Technical Specification, 3GPP, Technical Specification Group Radio Access Network; NR; Requirements for support of radio resource management (Release 16)".

* cited by examiner

*Primary Examiner* — Christopher R Crompton
(74) *Attorney, Agent, or Firm* — Imperium Patent Works; Zheng Jin (57) ABSTRACT

A method for expediting Secondary Cell (SCell) or Primary cell of a secondary cell group (PSCell) addition or activation is proposed. A User Equipment (UE) receives a command that indicates adding or activating an SCell or a PSCell, wherein the command comprises information of a temporary Reference Signal (RS). The UE detects the temporary RS according to the information, and uses the temporary RS to add or activate the SCell or the PSCell.

16 Claims, 9 Drawing Sheets

FIG. 1 (PIOR ART)

ENHANCEMENT TO EXPEDITE SECONDARY CELL (SCELL) OR PRIMARY SCELL (PSCELL) ADDITION OR ACTIVATION

CROSS REFERENCE TO RELATED APPLICATIONS

This application claims priority under 35 U.S.C. § 119 from U.S. Provisional Application No. 63/045,928, entitled "Synchronization Signal based temporary RS", filed on Jun. 30, 2020; U.S. Provisional Application No. 63/054,835, entitled "Synchronization Signal or TRS based temporary RS for fast PSCell Addition/Activation", filed on Jul. 22, 2020, the subject matter of which is incorporated herein by reference.

TECHNICAL FIELD

The disclosed embodiments relate generally to wireless communication, and, more particularly, to a method for expediting Secondary Cell (SCell) or Primary SCell (PS-Cell) addition or activation in 5G New Radio (NR).

BACKGROUND

The wireless communications network has grown exponentially over the years. A long-term evolution (LTE) system offers high peak data rates, low latency, improved system capacity, and low operating cost resulting from simplified network architecture. LTE systems, also known as the 4G system, also provide seamless integration to older wireless network, such as GSM, CDMA and universal mobile telecommunication system (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. The next generation mobile network (NGMN) board, has decided to focus the future NGMN activities on defining the end-to-end requirements for 5G new radio (NR) systems.

In 4G/LTE, a feature called "Carrier Aggregation (CA)" is supported to allow communications between a UE and a base station on multiple aggregated carriers or cells (e.g., a Primary Cell (PCell) and one or more Secondary Cells (SCells)). The design of SCell is to provide more data bandwidth in other carrier frequencies, typically higher frequencies, for boosting up data throughput while the PCell is more for ensuring the coverage. Later, in Rel-12 of 4G/LTE, a new feature called "Dual Connectivity (DC)" is proposed, with which a UE may be connected to multiple evolved NodeBs (eNBs) using multiple carriers or cells. Generally, one eNB may be configured as the Master Node which provides the control plane connection to the core network, and another eNB may be configured as the Secondary Node which provides additional radio resources to the UE without control plane connection to the core network. More specifically, the group of cells associated with the Master Node may be referred to as the Master Cell Group (MCG), while the group of cells associated with the Secondary Node may be referred to as the Secondary Cell Group (SCG).

Figure 1:
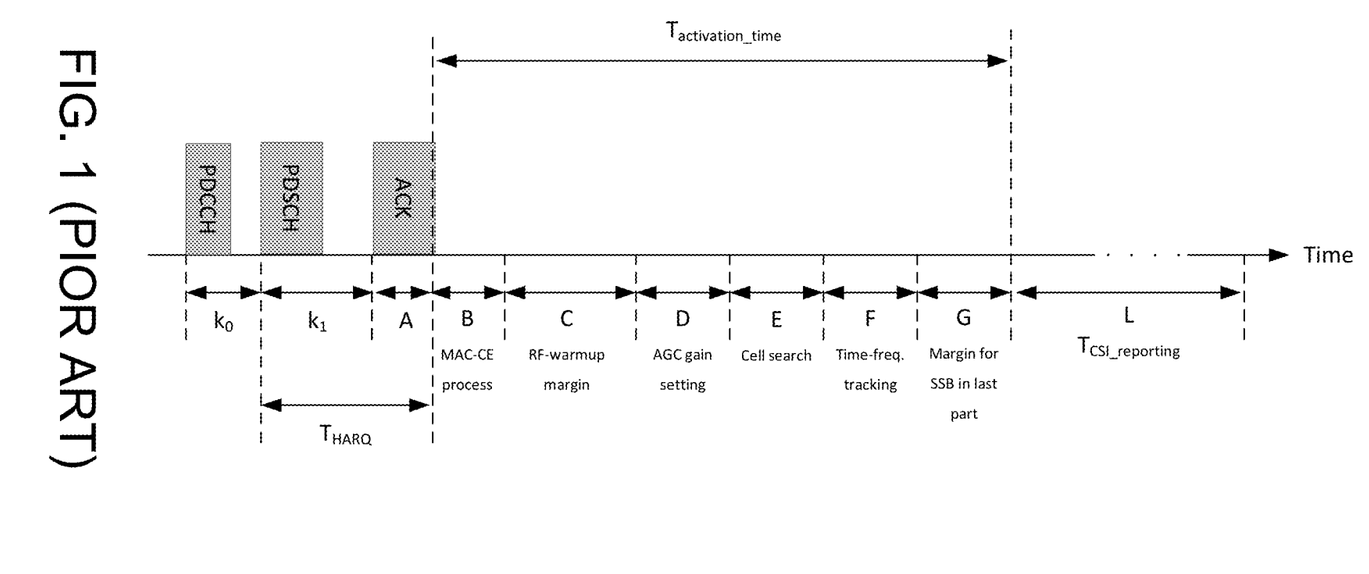
FIG. 1 shows a timeline of UE's operation in New Radio (NR) Secondary Cell (SCell) activation in Frequency Range 1 (FR1).

In 5G/NR, the CA and DC features are also employed. However, it is observed that, a significant amount of time may be required for the UE to perform SCell or PSCell (i.e., the Primary cell of a secondary cell group) addition/activation. FIG. 1 shows a timeline of UE's operation in NR SCell activation in Frequency Range 1 (FR1). As shown in FIG. 1, the components of timing latency for SCell activation includes 3 parts: $T_{HARQ}$, $T_{activation\_time}$, and $T_{CSI\_Reporting}$, and the dominant latency is $T_{activation\_time}$. For PSCell addition/activation, the procedure is similar to SCell activation and the dominant latency is also $T_{activation\_time}$. Due to the long activation time, the network seldom deactivates an SCell and this is bad for overall system resource utilization. Moreover, the timing latency caused by SCell/PSCell addition/activation may impact the UE's power consumption and data throughput performance.

A solution is sought.

SUMMARY

A method for expediting Secondary Cell (SCell) or Primary cell of a secondary cell group (PSCell) addition or activation is proposed. Specifically, the method is realized by the cooperation of a User Equipment (UE) and a Base Station (BS) in a wireless communication network (e.g., a 5G NR network). From the perspective of the UE, it receives a command that indicates adding or activating an SCell or a PSCell, wherein the command comprises information of a temporary Reference Signal (RS). The UE detects the temporary RS according to the information, and uses the temporary RS to add or activate the SCell or the PSCell. From the perspective of the BS, it transmits the command that indicates adding or activating an SCell or a PSCell to the UE, wherein the command comprises information of a temporary RS. Then, the BS transmits the temporary RS to the UE based on the information by the BS, thereby enabling the UE to use the temporary RS to add or activate the SCell or the PSCell.

In one embodiment, the temporary RS is a Synchronization Signal Block (SSB) comprising a Primary Synchronization Signal (PSS) and a Secondary Synchronization Signal (SSS) only. For example, each of the PSS and the SSS comprises a respective sequence with reversed order; or the PSS and the SSS are in a first symbol and a second symbol of the SSB in which the second symbol is prior to the first symbol; or each of the PSS and the SSS comprises a respective sequence generated from a Primary Cell Identity (PCI) with a value greater than 1007.

In another embodiment, the temporary RS is an SSB comprising a PSS, an SSS, and Physical Broadcast Channel (PBCH) data. For example, each of the PSS and the SSS comprises a respective sequence with reversed order; or each of the PSS and the SSS comprises a respective sequence generated from a PCI with a value greater than 1007; or the PSS and the SSS are in a first symbol and a second symbol of the SSB in which the second symbol is prior to the first symbol.

In another embodiment, the temporary RS is a Tracking RS (TRS).

The temporary RS is detected after completing Radio Frequency (RF) retuning for the SCell or the PSCell, and the temporary RS is detected/transmitted on each beam. The command is received/transmitted in a Radio Resource Control (RRC) configuration, a Medium Access Control (MAC) Control Element (CE), or a Downlink Control Information (DCI); and the information of the temporary RS comprises a slot offset between a slot where the command is transmitted to the UE and a first slot of the temporary RS, a time-frequency resource location, and a number of consecutive temporary RS bursts. In some implementations, the information of the temporary RS may be received/transmitted/carried in an RPC configuration which triggers the SCell/PSCell addition or activation, or in a MAC CE with the command for the PSCell/SCell activation, or in a DCI on the PCell which triggers the MAC CE with the command for the SCell/PSCell activation or comes after the interruption of the PCell due to SCell/PSCell RF retuning (does not change legacy DCI format).

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 2:
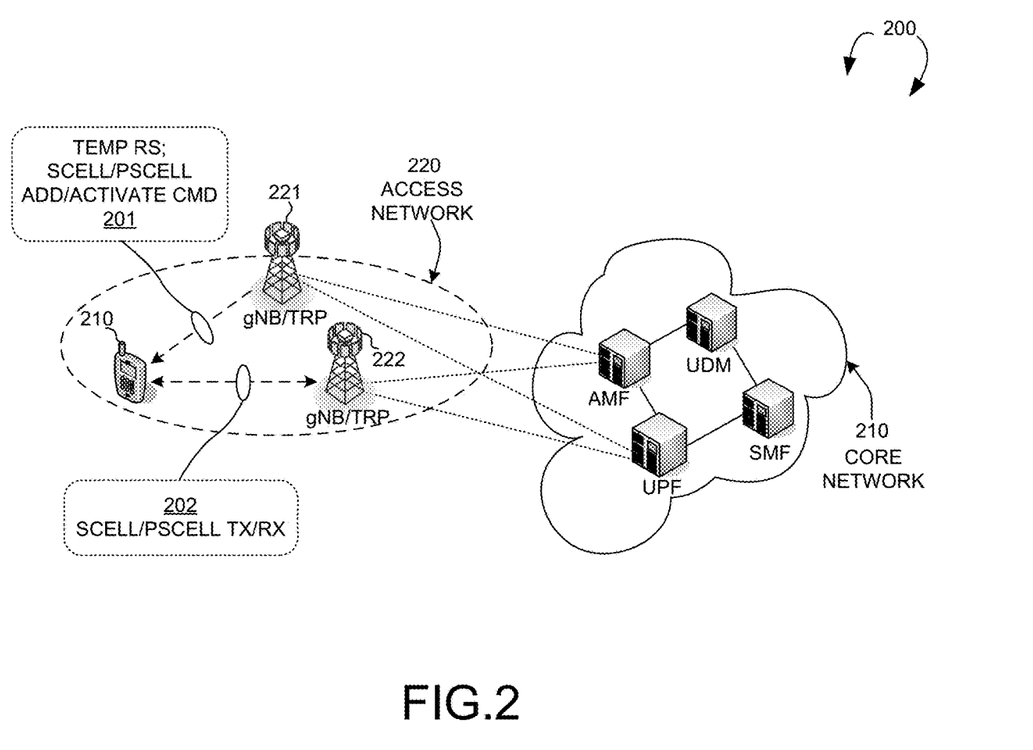
FIG. 2 illustrates an exemplary 5G New Radio (NR) network 200 supporting fast SCell or Primary cell of a secondary cell group (PSCell) addition/activation in accordance with aspects of the current invention.

FIG. 2 illustrates an exemplary 5G New Radio (NR) network 200 supporting fast Secondary Cell (SCell) or Primary cell of a secondary cell group (PSCell) addition/activation in accordance with aspects of the current invention. The 5G NR network 200 comprises a User Equipment (UE) 210 communicatively connected to a Base Station (BS) (e.g., gNB 221) of an access network 220 which provides radio access using a Radio Access Technology (RAT) (e.g., the 5G NR technology). The access network 220 is connected to a 5G core network 230 by means of the NG interface, more specifically to a User Plane Function (UPF) by means of the NG user-plane part (NG-u), and to a Mobility Management Function (AMF) by means of the NG control-plane part (NG-c). One gNB can be connected to multiple UPFs/AMFs for the purpose of load sharing and redundancy. The UE 210 may be a smart phone, a wearable device, an Internet of Things (IoT) device, and a tablet, etc. Alternatively, UE 210 may be a Notebook (NB) or Personal Computer (PC) inserted or installed with a data card which includes a modem and RF transceiver(s) to provide the functionality of wireless communication.

The gNB 221 may provide communication coverage for a geographic coverage area in which communications with the UE 210 is supported via a communication link 201. In one embodiment, the gNB 221 may be configured as a Master Node for serving the UE 210, and the communication link 201 between the gNB 221 and the UE 210 may utilize one or more frequency carriers to form one or more cells (e.g., a PCell and one or more SCells). The communication link 201 shown in the 5G NR network 200 may include transmission of control-plane data, such as an SCell/PSCell addition/activation command, and Reference Signals (including the temporary RS used for SCell/PSCell addition/ activation), from the gNB 221 to the UE 210 (e.g., on the Physical Downlink Control Channel (PDCCH) or Physical Downlink Shared Channel (PDSCH)). The temporary RS may be transmitted on each beam.

The gNB 222 may provide communication coverage for a geographic coverage area in which communications with the UE 210 is supported via a communication link 202. In one embodiment, the gNB 222 may be configured as a Secondary Node for serving the UE 210, and the communication link 202 between the gNB 222 and the UE 210 may utilize one or more frequency carriers to form one or more cells (e.g., a PSCell and one or more SCells). The communication link 202 shown in the 5G NR network 200 may include uplink transmission from the UE 210 to the gNB 222 (e.g., on the Physical Uplink Control Channel (PUCCH) or Physical Uplink Shared Channel (PUSCH)) or downlink transmissions from the gNB 222 to the UE 210 (e.g., on the PDCCH or PPDSCH).

In accordance with one novel aspect, the UE 210 may receive the SCell/PSCell addition/activation command (e.g., in Radio Resource Control (RRC) configuration, a Medium Access Control (MAC) Control Element (CE), or a Downlink Control Information (DCI)) with temporary RS information from the gNB 221, and detect the temporary RS according to the temporary RS information included in the command. In some implementations, the temporary RS information may be received/carried in an RPC configuration which triggers the SCell/PSCell addition or activation, or in a MAC CE with the command for the PSCell/SCell activation, or n DCI on the PCell which triggers the MAC CE with the command for the SCell/PSCell activation or comes after the interruption of the PCell due to SCell/PSCell RF retuning (does not change legacy DCI format). For example, the temporary RS information may comprise (1) a slot offset between the slot where the command is transmitted and the first slot of the temporary RS, (2) a time-frequency resource location, and (3) the number of consecutive temporary RS bursts. With the temporary RS, the UE 210 may expedite SCell/PSCell addition/activation. It should be noted that regular RS is generally used for various purposes and is transmitted in specific time-frequency resources with predefined periodicity which may be long and cause undesired timing latency if the regular RS is used as the reference for conducting SCell/PSCell addition/activation. On the contrary, the temporary RS in the current invention is dedicated for the purpose of expediting SCell/PSCell addition/activation, and it may be transmitted after the UE 210 completed Radio Frequency (RF) returning for the SCell/PSCell.

Figure 3:
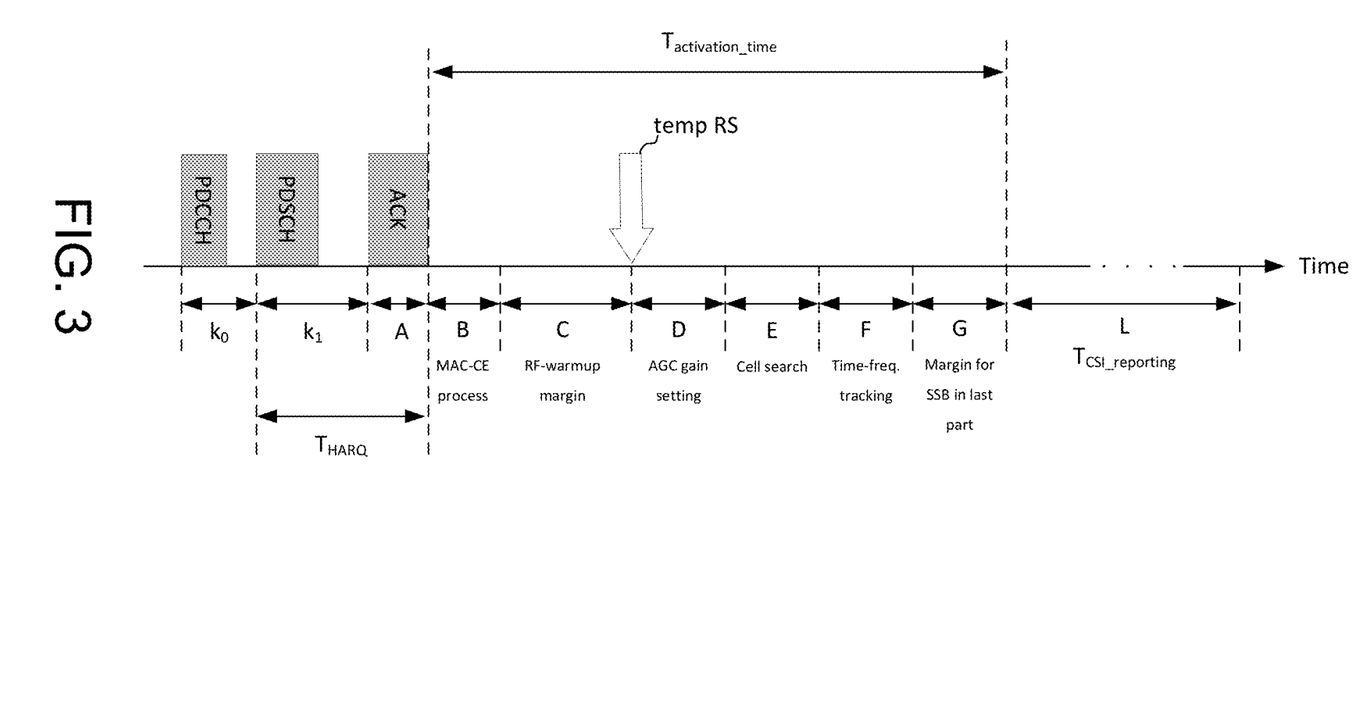
FIG. 3 shows a timeline of UE's operation in NR SCell activation in FR1 in accordance with aspects of the current invention.

FIG. 3 shows a timeline of UE's operation in NR SCell activation in Frequency Range 1 (FR1) in accordance with aspects of the current invention. As shown in FIG. 3, the temporary RS may be transmitted as soon as the UE 210 completed RF returning for the SCell/PSCell, so that the UE 210 may use the temporary RS to continue the rest processes in SCell/PSCell addition/activation. It should be understood that the timeline with respect to FR1 in FIG. 3 is for illustrative purposes only and is not intended to limit the scope of the invention. For example, the current invention may also be applied in FR2 where the temporary RS should be transmitted at some time after the UE completed RF returning for the SCell/PSCell, so that the UE may use the temporary RS to continue the rest processes in SCell/PSCell addition/activation in FR2.

In one embodiment, the temporary RS is a Synchronization Signal Block (SSB) comprising a Primary Synchronization Signal (PSS) and a Secondary Synchronization Signal (SSS) only. For example, each of the PSS and the SSS comprises a respective sequence with reversed order. Alternatively, the PSS and the SSS are in a first symbol and a second symbol of the SSB in which the second symbol is prior to the first symbol. Alternatively, each of the PSS and the SSS comprises a respective sequence generated from a Primary Cell Identity (PCI) with a value greater than 1007.

In another embodiment, the temporary RS is an SSB comprising a PSS, an SSS, and Physical Broadcast Channel (PBCH) data. For example, each of the PSS and the SSS comprises a respective sequence with reversed order. Alternatively, each of the PSS and the SSS comprises a respective sequence generated from a Primary Cell Identity (PCI) with a value greater than 1007. Alternatively, the PSS and the SSS are in a first symbol and a second symbol of the SSB in which the second symbol is prior to the first symbol.

In another embodiment, the temporary RS is a Tracking RS (TRS).

Figure 4:
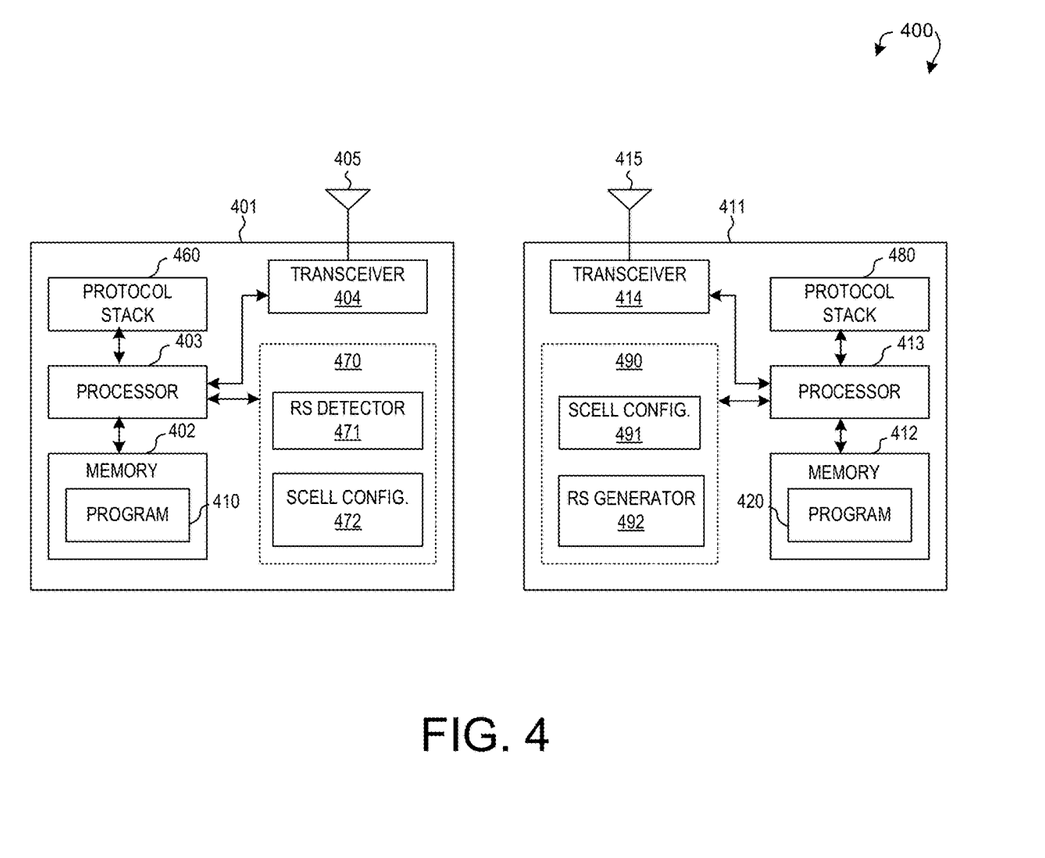
FIG. 4 illustrates simplified block diagrams of wireless devices, e.g., a UE 401 and a gNB 411 in accordance with embodiments of the current invention.

FIG. 4 illustrates simplified block diagrams of wireless devices, e.g., a UE 401 and a gNB 411 in accordance with embodiments of the current invention. The gNB 411 has an antenna 415, which transmits and receives radio signals. An RF transceiver module 414, coupled with the antenna 415, receives RF signals from the antenna 415, converts them to baseband signals and sends them to the processor 413. The RF transceiver 414 also converts received baseband signals from the processor 413, converts them to RF signals, and sends out to the antenna 415. The processor 413 processes the received baseband signals and invokes different functional modules to perform features in the gNB 411. The memory 412 stores program instructions and data 420 to control the operations of the gNB 411. In the example of FIG. 4, the gNB 411 also includes a protocol stack 480 and a set of control function modules and circuits 490. The protocol stack 480 may include a Non-Access-Stratum (NAS) layer to communicate with an AMF/SMF/MME entity connecting to the core network, a Radio Resource Control (RRC) layer for high layer configuration and control, a Packet Data Convergence Protocol/Radio Link Control (PDCP/RLC) layer, a Media Access Control (MAC) layer, and a Physical (PHY) layer. In one example, the control function modules and circuits 490 include an SCell configurator circuit 491 that manages the configuration (e.g., addition/activation) of the PSCell and one or more SCells for the UE 401 by transmitting a command to indicate SCell/PSCell addition/activation, and an RS generator 492 that generates the temporary RS used for SCell/PSCell addition/activation.

Similarly, the UE 401 has a memory 402, a processor 403, and an RF transceiver module 404. The RF transceiver 404 is coupled with the antenna 405, receives RF signals from the antenna 405, converts them to baseband signals, and sends them to the processor 403. The RF transceiver 404 also converts received baseband signals from the processor 403, converts them to RF signals, and sends out to the antenna 405. The processor 403 processes the received baseband signals (e.g., comprising an SCell/PSCell addition/activation command) and invokes different functional modules and circuits to perform features in the UE 401. The memory 402 stores data and program instructions 410 to be executed by the processor 403 to control the operations of the UE 401. Suitable processors include, by way of example, a special purpose processor, a Digital Signal Processor (DSP), a plurality of micro-processors, one or more micro-processor associated with a DSP core, a controller, a micro-controller, Application Specific Integrated Circuits (ASICs), File Programmable Gate Array (FPGA) circuits, and other type of Integrated Circuits (ICs), and/or state machines. A processor in associated with software may be used to implement and configure features of the UE 401.

The UE 401 also includes a protocol stack 460 and a set of control function modules and circuits 470. The protocol stack 460 may include a NAS layer to communicate with an AMF/SMF/MME entity connecting to the core network, an RRC layer for high layer configuration and control, a PDCP/RLC layer, a MAC layer, and a PHY layer. The Control function modules and circuits 470 may be implemented and configured by software, firmware, hardware, and/or combination thereof. The control function modules and circuits 470, when executed by the processor 403 via program instructions contained in the memory 402, interwork with each other to allow the UE 401 to perform embodiments and functional tasks and features in the network.

In one example, the control function modules and circuits 470 include an RS detector circuit 471 that detects the temporary RS according to the information provided in the received SCell/PSCell addition/activation command, and an SCell configurator circuit 472 that uses the temporary RS to add or activate the SCell/PSCell.

Figure 5A:
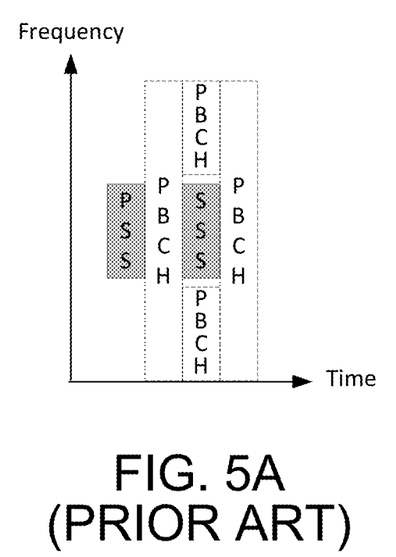
FIG. 5A illustrates a regular SSB without PBCH data in conventional R-15 design.

FIG. 5A illustrates a regular SSB without PBCH data in conventional R-15 design. The regular SSB without PBCH data comprises a PSS and an SSS, and the PSS is located 2 Orthogonal Frequency-Division Multiplexing (OFDM) symbols prior to the SSS, while the time-frequency locations for PBCH data are left empty or filled with null data.

Figure 5B:
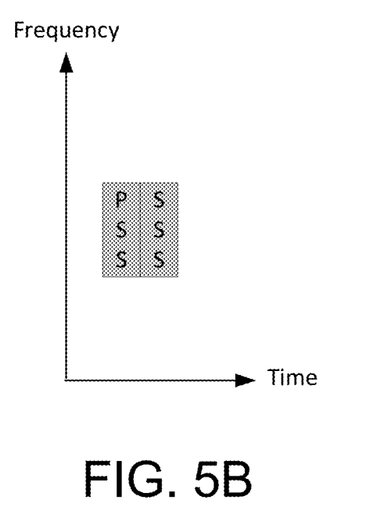
FIG. 5B and FIG. 5C illustrate different examples of a temporary RS comprising an SSB without PBCH data in accordance with one novel aspect.
Figure 5C:
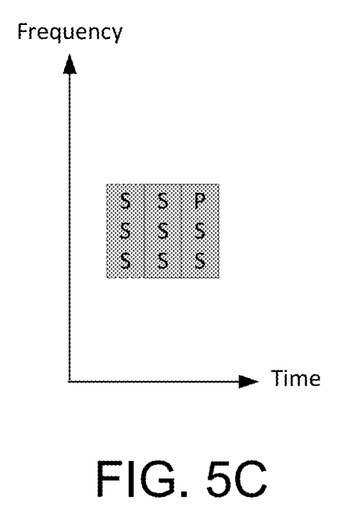

FIGS. 5B and 5C illustrate different examples of a temporary RS comprising an SSB without PBCH data in accordance with one novel aspect. As shown in FIGS. 5B-5C, the SSB comprises a PSS and an SSS only (i.e., no PBCH data), and the PSS and the SSS can be arranged in any pattern except the relative time-resource locations in conventional design (i.e., PSS located two symbols before SSS). In the example of FIG. 5B, the PSS is located before the SSS, and they are placed in 2 adjacent OFDM symbols. In the example of FIG. 5C, the PSS is located after an SSS, and they are placed in 2 adjacent OFDM symbols. Optionally, the SSB may comprise an additional SSS (denoted with dashed line in FIG. 5C) which is located 1 OFDM symbol prior to the existing SSS.

Moreover, in order to allow the UE to identity the SSBs as temporary RS, conventional Rel-15 PSS/SSS sequence (i.e., generated from Primary Cell Identity (PCI) with a value less than or equal to 1007) with reversed sequence order may be applied in the SSB. Alternatively, conventional Rel-15 PSS/SSS sequence (i.e., generated from PCI with a value less than or equal to 1007) with different symbol order may be applied in the SSB. Alternatively, a non-conventional PSS/SSS sequence which is generated from PCI with a value greater than 1007 may be applied in the SSB.

Figure 6:
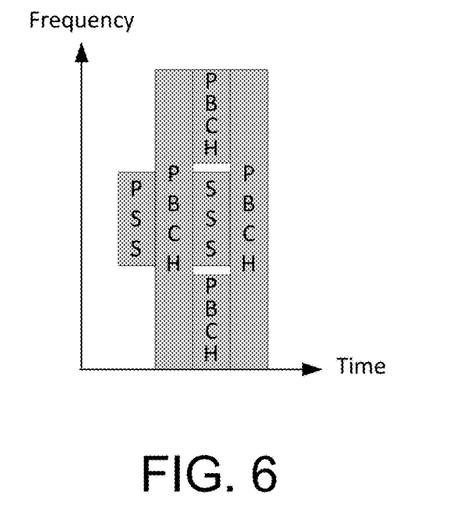
FIG. 6 illustrates a temporary RS comprising an SSB with PBCH data in accordance with one novel aspect.

FIG. 6 illustrates a temporary RS comprising an SSB with PBCH data in accordance with one novel aspect. As shown in FIG. 6, the SSB comprises a PSS, an SSS, and PBCH data in conventional Rel-15 SSB format with altered PSS/SSS sequence. In one example, the conventional Rel-15 PSS/SSS sequence (i.e., generated from PCI with a value less than or equal to 1007) with reversed sequence order are applied in the PSS/SSS in the SSB. In another example, a non-conventional PSS/SSS sequence which is generated from PCI with a value greater than 1007 may be applied in the SSB.

Figure 7A:
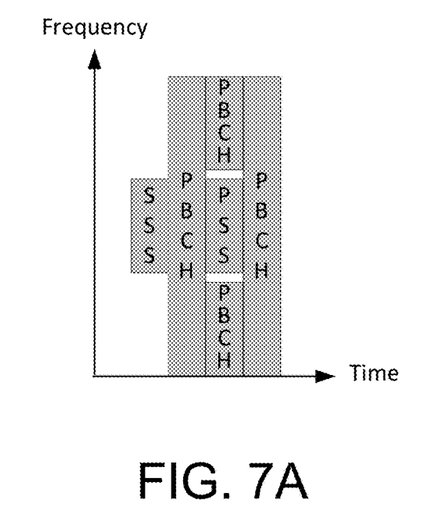
FIG. 7A and FIG. 7B illustrate more examples of a temporary RS comprising an SSB with PBCH data in accordance with one novel aspect.
Figure 7B:
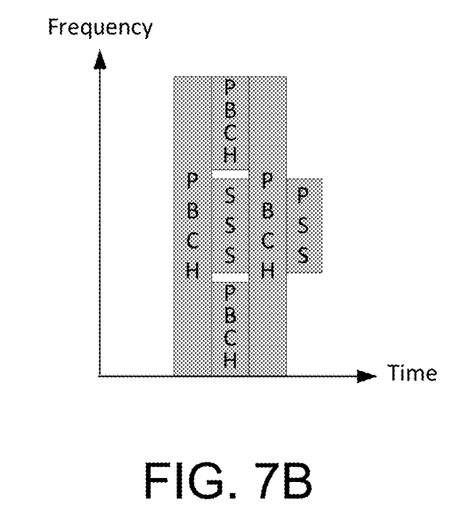

FIGS. 7A and 7B illustrate more examples of a temporary RS comprising an SSB with PBCH data in accordance with one novel aspect. As shown in FIGS. 7A-7B, the SSB comprises a PSS, an SSS, and PBCH data, wherein the symbol order of the PSS and the SSS are altered. In the example of FIG. 7A, the SSS is located 2 OFDM symbols prior to the PSS, and is located prior to the first symbol of the PBCH data. In the example of FIG. 7B, the PSS is located 2 OFDM symbols subsequent to the SSS, and is located subsequent to the last symbol of the PBCH data. Alternatively, any symbol order of an SSB (consisting of 2 symbols for PBCH data, 1 symbol for PSS, and 1 symbol for SSS) except the conventional Rel-15 SSB format (i.e., with symbol order: PSS→PBCH→SSS→PBCH) may be applied.

Figure 8:
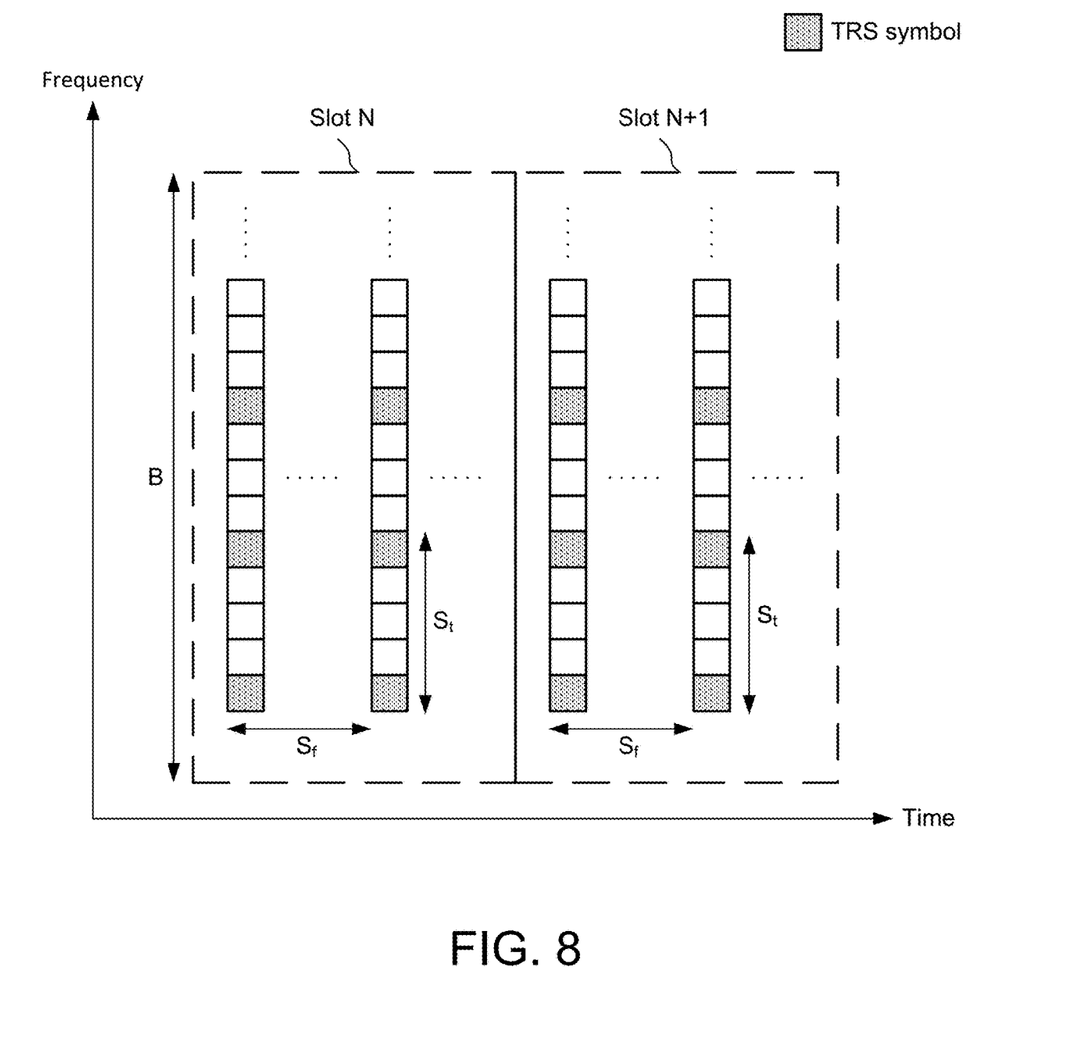
FIG. 8 illustrates a temporary RS comprising a TRS in accordance with one novel aspect.

FIG. 8 illustrates a temporary RS comprising a TRS in accordance with one novel aspect. The TRS can be realized by using a periodic/aperiodic Channel State Information-Reference Signal (CSI-RS) resource set consisting of a couple of Non-Zero Power (NZP) CSI-RS resources. In the example of FIG. 8, the structure of a TRS burst is defined by the following parameters, including (1) X: the number of consecutive slots with TRS in a burst, i.e., the burst length in terms of slot number (X can be 1 or 2, and it is exemplified as 2 in this example), (2) B: the bandwidth in terms of Resource Blocks (RBs), (3) $S_f$: the subcarrier spacing between two TRS Resource Elements (REs) (e.g., $S_f$=4), and (4) St: OFDM symbol spacing between two TRS symbols in a slot.

Figure 9:
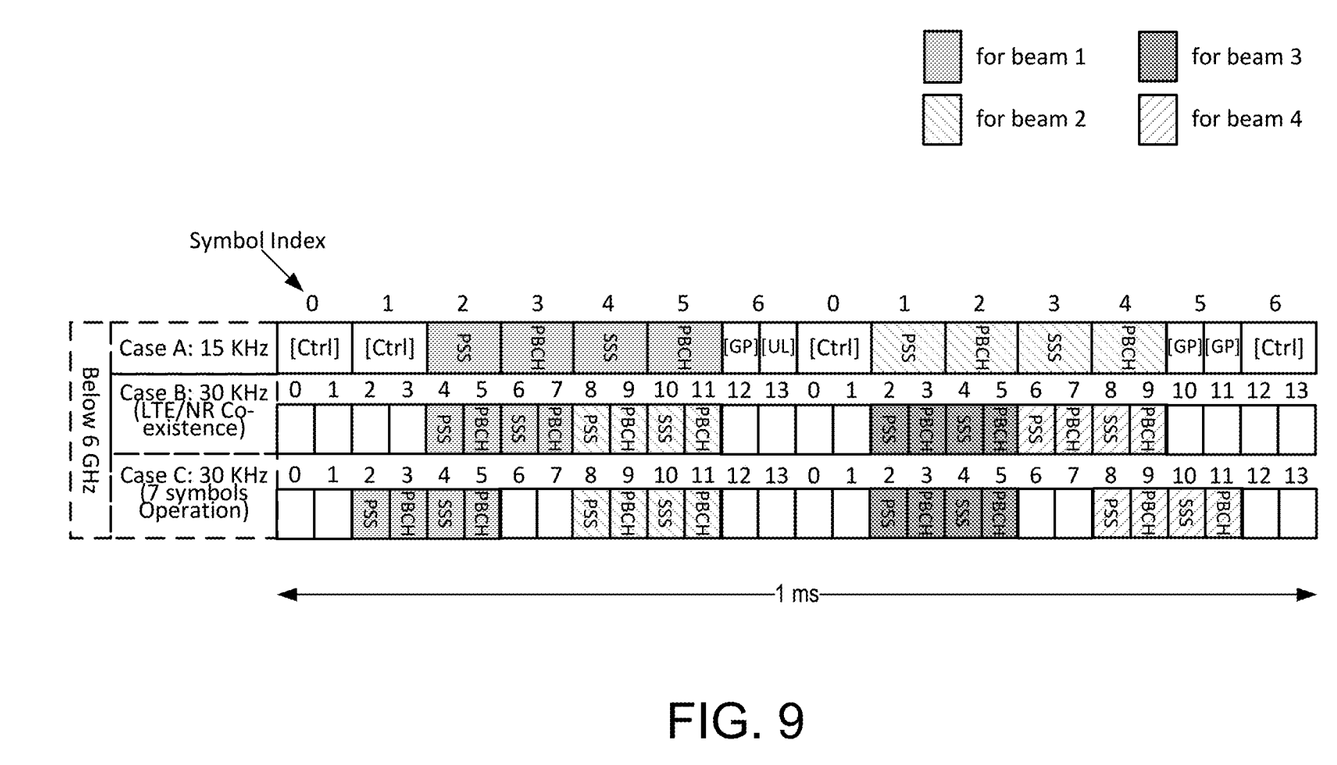
FIG. 9 illustrates the time location and multi-beam consideration for a temporary RS in accordance with one novel aspect.

FIG. 9 illustrates the time location and multi-beam consideration for a temporary RS in accordance with one novel aspect. In multi-beam scenario, a burst of repetition of the temporary RS is used to provide one set of temporary RS on each beam. In the example of FIG. 9, the time location of the first symbol in each set of temporary RS may follow the time location of the first symbol of a conventional SSB (PSS) on that SCell/PSCell.

Figure 10:
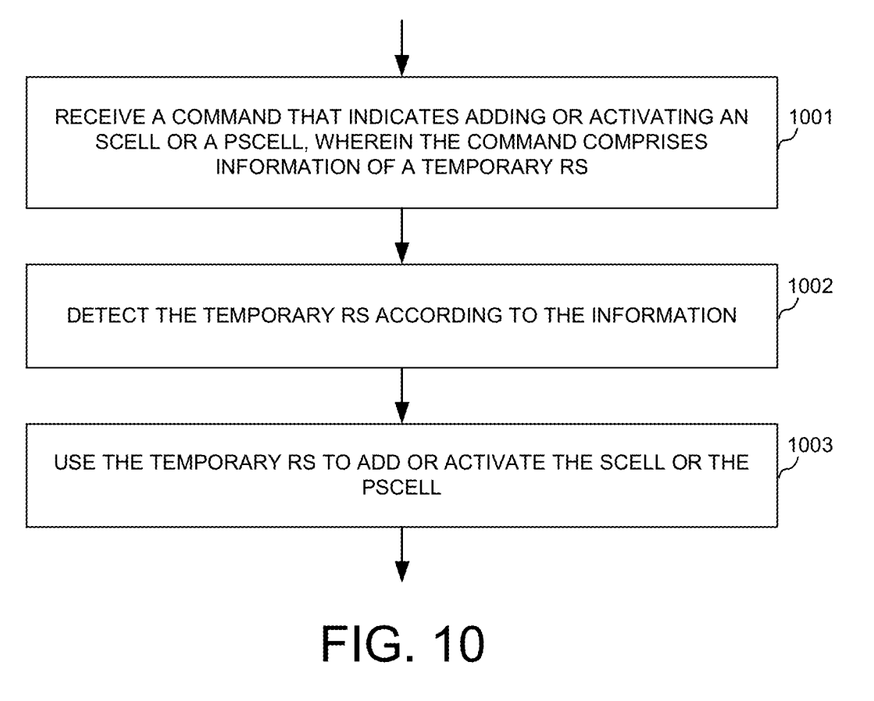
FIG. 10 illustrates a flow chart of a method for expediting SCell/PSCell addition or activation from the perspective of a UE in accordance with one novel aspect.

FIG. 10 illustrates a flow chart of a method for expediting SCell/PSCell addition or activation from the perspective of a UE in accordance with one novel aspect. In step 1001, the UE receives a command that indicates adding or activating an SCell or a PSCell, wherein the command comprises information of a temporary RS. In step 1002, the UE detects the temporary RS according to the information. In step S1003, the UE uses the temporary RS to add or activate the SCell or the PSCell.

Figure 11:
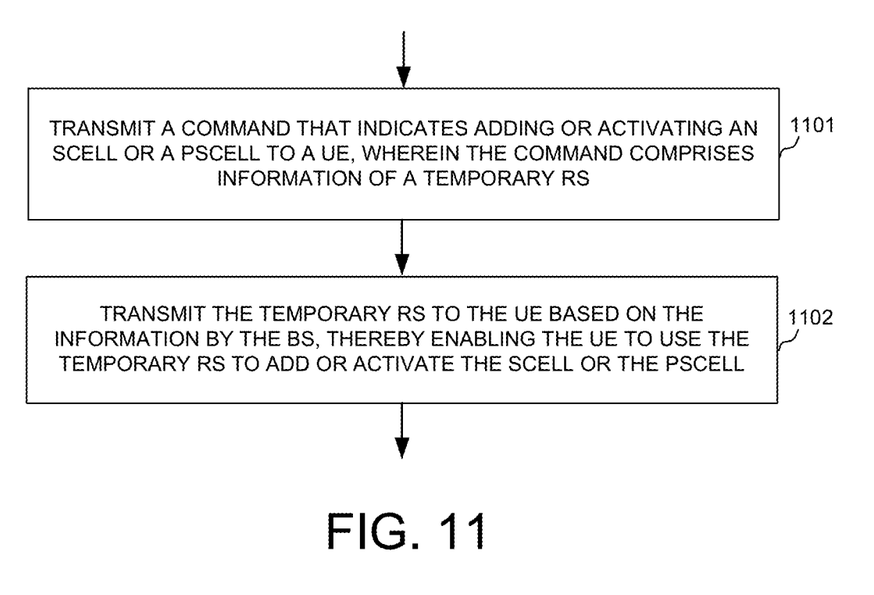
FIG. 11 illustrates a flow chart of a method for expediting SCell/PSCell addition or activation from the perspective of a BS in accordance with one novel aspect.

FIG. 11 illustrates a flow chart of a method for expediting SCell/PSCell addition or activation from the perspective of a BS in accordance with one novel aspect. In step 1001, the BS transmits a command that indicates adding or activating an SCell or a PSCell to a UE, wherein the command comprises information of a temporary RS. In step S1102, the BS transmits the temporary RS to the UE based on the information by the BS, thereby enabling the UE to use the temporary RS to add or activate the SCell or the PSCell.

In one embodiment, the temporary RS is an SSB comprising a PSS and an SSS only. For example, each of the PSS and the SSS comprises a respective sequence with reversed order; or the PSS and the SSS are in a first symbol and a second symbol of the SSB in which the second symbol is prior to the first symbol; or each of the PSS and the SSS comprises a respective sequence generated from a PCI with a value greater than 1007.

In another embodiment, the temporary RS is an SSB comprising a PSS, an SSS, and PBCH data. For example, each of the PSS and the SSS comprises a respective sequence with reversed order; or each of the PSS and the SSS comprises a respective sequence generated from a PCI with a value greater than 1007; or the PSS and the SSS are in a first symbol and a second symbol of the SSB in which the second symbol is prior to the first symbol.

In another embodiment, the temporary RS is a TRS.

The temporary RS may be transmitted to the UE after the UE completes RF returning for the SCell or the PSCell, and the temporary RS is transmitted on each beam. The command may be received/transmitted in an RRC configuration, a MAC CE, or a DCI; and the information of the temporary RS comprises a slot offset between a slot where the command is transmitted to the UE and a first slot of the temporary RS, a time-frequency resource location, and a number of consecutive temporary RS bursts.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
receiving a command that indicates adding or activating a Secondary Cell (SCell) or a Primary cell of a secondary cell group (PSCell) by a User Equipment (UE), wherein the command comprises information of a temporary Reference Signal (RS);
detecting the temporary RS according to the information by the UE; and
using the temporary RS to add or activate the SCell or the PSCell by the UE,
wherein the temporary RS is a Synchronization Signal Block (SSB) at least comprising a Primary Synchronization Signal (PSS) and a Secondary Synchronization Signal (SSS),
wherein each of the PSS and the SSS comprises a respective sequence with reversed order or a respective sequence generated from a Primary Cell Identity (PCI) with a value greater than 1007.

2. The method of claim 1, wherein the temporary RS is a SSB comprising a Primary Synchronization Signal (PSS) and a Secondary Synchronization Signal (SSS) only.

3. The method of claim 1, wherein the temporary RS is an SSB comprising a PSS, an SSS, and Physical Broadcast Channel (PBCH) data.

4. The method of claim 1, wherein the temporary RS is a Tracking RS (TRS).

5. The method of claim 1, wherein the temporary RS is detected after completing Radio Frequency (RF) returning for the SCell or the PSCell, and the temporary RS is detected on each beam.

6. The method of claim 1, wherein the command is received in a Radio Resource Control (RRC) configuration, a Medium Access Control (MAC) Control Element (CE), or a Downlink Control Information (DCI); and the information of the temporary RS comprises a slot offset between a slot where the command is transmitted to the UE and a first slot of the temporary RS, a time-frequency resource location, and a number of consecutive temporary RS bursts.

7. A User Equipment (UE), comprising:
a receiver that receives a command that indicates adding or activating a Secondary Cell (SCell) or a Primary cell of a secondary cell group (PSCell), wherein the command comprises information of a temporary Reference Signal (RS);
an RS detector that detects the temporary RS according to the information; and
an SCell configurator that uses the temporary RS to add or activate the SCell or the PSCell,
wherein the temporary RS is a Synchronization Signal Block (SSB) at least comprising a Primary Synchronization Signal (PSS) and a Secondary Synchronization Signal (SSS),
wherein each of the PSS and the SSS comprises a respective sequence with reversed order or a respective sequence generated from a Primary Cell Identity (PCI) with a value greater than 1007.

8. The UE of claim 7, wherein the temporary RS is a SSB comprising a Primary Synchronization Signal (PSS) and a Secondary Synchronization Signal (SSS) only.

9. The UE of claim 7, wherein the temporary RS is an SSB comprising a PSS, an SSS, and Physical Broadcast Channel (PBCH) data.

10. The UE of claim 7, wherein the temporary RS is a Tracking RS (TRS).

11. The UE of claim 7, wherein the command is received in a Radio Resource Control (RRC) configuration, a Medium Access Control (MAC) Control Element (CE), or a Downlink Control Information (DCI); and the information of the temporary RS comprises a slot offset between a slot where the command is transmitted to the UE and a first slot of the temporary RS, a time-frequency resource location, and a number of consecutive temporary RS bursts.

12. A method, comprising:
transmitting a command that indicates adding or activating a Secondary Cell (SCell) or a Primary cell of a secondary cell group (PSCell) to a User Equipment (UE) by a Base Station (BS), wherein the command comprises information of a temporary Reference Signal (RS); and
transmitting the temporary RS to the UE based on the information by the BS, thereby enabling the UE to use the temporary RS to add or activate the SCell or the PSCell,
wherein the temporary RS is a Synchronization Signal Block (SSB) at least comprising a Primary Synchronization Signal (PSS) and a Secondary Synchronization Signal (SSS),
wherein each of the PSS and the SSS comprises a respective sequence with reversed order or a respective sequence generated from a Primary Cell Identity (PCI) with a value greater than 1007.

13. The method of claim 12, wherein the temporary RS is a SSB comprising a Primary Synchronization Signal (PSS) and a Secondary Synchronization Signal (SSS) only.

14. The method of claim 12, wherein the temporary RS is an SSB comprising a PSS, an SSS, and Physical Broadcast Channel (PBCH) data.

15. The method of claim 12, wherein the temporary RS is a Tracking RS (TRS).

16. The method of claim 12, wherein the command is transmitted in a Radio Resource Control (RRC) configuration, a Medium Access Control (MAC) Control Element (CE), or a Downlink Control Information (DCI); and the information of the temporary RS comprises a slot offset between a slot where the command is transmitted to the UE and a first slot of the temporary RS, a time-frequency resource location, and a number of consecutive temporary RS bursts.

* * * * *